United States Patent
Blanton

(10) Patent No.: US 10,948,203 B2
(45) Date of Patent: Mar. 16, 2021

(54) HEAT PUMP WITH HOT GAS REHEAT SYSTEMS AND METHODS

(71) Applicant: Johnson Controls Technology Company, Auburn Hills, MI (US)

(72) Inventor: Norman J. Blanton, Norman, OK (US)

(73) Assignee: Johnson Controls Technology Company, Auburn Hills, MI (US)

( * ) Notice: Subject to any disclaimer, the term of this patent is extended or adjusted under 35 U.S.C. 154(b) by 110 days.

(21) Appl. No.: 16/008,939

(22) Filed: Jun. 14, 2018

(65) Prior Publication Data

US 2019/0368754 A1 Dec. 5, 2019

Related U.S. Application Data

(60) Provisional application No. 62/680,288, filed on Jun. 4, 2018.

(51) Int. Cl.

| | |
|---|---|
| *F25B 30/02* | (2006.01) |
| *F24F 3/153* | (2006.01) |
| *G05D 23/19* | (2006.01) |
| *F25B 29/00* | (2006.01) |
| *F25B 41/04* | (2006.01) |
| *F25B 41/00* | (2021.01) |

(52) U.S. Cl.
CPC ............ *F24F 3/153* (2013.01); *F25B 29/003* (2013.01); *F25B 30/02* (2013.01); *F25B 41/003* (2013.01); *F25B 41/04* (2013.01); *G05D 23/1919* (2013.01)

(58) Field of Classification Search
CPC . F24F 3/153; F25B 13/00; F25B 2313/02321; F25B 2313/02323; F25B 2313/029; F25B 2500/02; F25B 29/003; F25B 30/02; F25B 41/003; F25B 41/04
See application file for complete search history.

(56) References Cited

U.S. PATENT DOCUMENTS

| | | | |
|---|---|---|---|
| 6,644,049 B2 * | 11/2003 | Alford | F24F 3/1405 62/173 |
| 6,666,040 B1 | 12/2003 | Groenewold et al. | |
| 7,275,384 B2 | 10/2007 | Taras et al. | |
| 7,287,394 B2 | 10/2007 | Taras et al. | |
| 7,290,399 B2 | 11/2007 | Taras et al. | |

(Continued)

FOREIGN PATENT DOCUMENTS

WO 2012097445 A1 7/2012

*Primary Examiner* — Filip Zec
(74) *Attorney, Agent, or Firm* — Fletcher Yoder, P.C.

(57) ABSTRACT

The present disclosure relates to a climate management system having an outdoor coil of a refrigerant circuit, a first indoor coil of the refrigerant circuit, and a second indoor coil of the refrigerant circuit disposed downstream of the first indoor coil with respect to a flow of air directed across the first indoor coil and the second indoor coil. The climate management system is configured to, in a cooling mode, direct refrigerant flow in a first direction through the outdoor coil, direct refrigerant flow through the first indoor coil, and restrict refrigerant flow from the second indoor coil. The climate management system is also configured to, in a heating mode, direct refrigerant flow in a second direction through the outdoor coil, direct refrigerant flow through the second indoor coil, and restrict refrigerant flow from the first indoor coil. The second direction is opposite the first direction.

25 Claims, 9 Drawing Sheets

(56) References Cited

U.S. PATENT DOCUMENTS

| | | | |
|---|---|---|---|
| 7,726,140 B2 | 6/2010 | Rayburn et al. | |
| 8,220,277 B2 * | 7/2012 | Dieckmann | F24F 3/153 62/93 |
| 9,010,135 B2 * | 4/2015 | Kawano | F25B 13/00 62/174 |
| 9,964,346 B2 * | 5/2018 | Hua | F24F 3/153 |
| 10,234,149 B2 * | 3/2019 | Alford | F24F 3/153 |
| 2004/0035135 A1 * | 2/2004 | Park | F25B 13/00 62/324.6 |
| 2013/0098092 A1 * | 4/2013 | Wakamoto | F25B 47/025 62/278 |
| 2013/0283831 A1 * | 10/2013 | Hua | F25B 41/04 62/115 |
| 2015/0176879 A1 * | 6/2015 | Okano | F25B 13/00 62/160 |
| 2017/0299202 A1 * | 10/2017 | Hancock | F24F 11/52 |
| 2019/0271478 A1 * | 9/2019 | Henderson | F24F 3/153 |

* cited by examiner

HEAT PUMP WITH HOT GAS REHEAT SYSTEMS AND METHODS

CROSS REFERENCE TO RELATED APPLICATION

This application is a Non-Provisional Application claiming priority to U.S. Provisional Application No. 62/680,288, entitled "HEAT PUMP WITH HOT GAS REHEAT SYSTEMS AND METHODS," filed Jun. 4, 2018, which is hereby incorporated by reference in its entirety for all purposes.

BACKGROUND

The present disclosure relates generally to heating, ventilation, and air conditioning systems. A wide range of applications exist for heating, ventilating, and air conditioning (HVAC) systems. For example, residential, light commercial, commercial, and industrial systems are used to control temperatures and air quality in residences and buildings. Such systems often are dedicated to either heating or cooling, although systems are common that perform both of these functions. Very generally, these systems operate by implementing a thermal cycle in which fluids are heated and cooled to provide the desired temperature in a controlled space, typically the inside of a residence or building. Similar systems are used for vehicle heating and cooling, and as well as for general refrigeration. Some HVAC systems may utilize an indoor heat exchanger to act as a condenser or an evaporator, depending on the mode of operation of the HVAC system. Particularly, in a heating mode, the indoor heat exchanger may be utilized as a condenser and, in a cooling mode, the indoor heat exchanger may be utilized as an evaporator. However, because the indoor heat exchanger may be designed to function as both a condenser and an evaporator in such embodiments, the indoor heat exchanger may be less efficient as an evaporator compared to a heat exchanger that is specifically designed to function as an evaporator, which may result in a decreased efficiency of the HVAC system.

SUMMARY

The present disclosure relates to a climate management system having an outdoor coil of a refrigerant circuit, a first indoor coil of the refrigerant circuit, and a second indoor coil of the refrigerant circuit disposed downstream of the first indoor coil with respect to a flow of air directed across the first indoor coil and the second indoor coil. The climate management system is configured to, in a cooling mode, direct refrigerant flow in a first direction through the outdoor coil, direct refrigerant flow through the first indoor coil, and restrict refrigerant flow from the second indoor coil. The climate management system is also configured to, in a heating mode, direct refrigerant flow in a second direction through the outdoor coil, direct refrigerant flow through the second indoor coil, and restrict refrigerant flow from the first indoor coil. The second direction is opposite the first direction.

The present disclosure also relates to a climate management system having a control system configured to control climate characteristics in a building. The control system includes a memory device and a processor. The memory device includes instructions that, when executed by the processor, cause the processor to: direct refrigerant flow through an outdoor coil in a first direction and through a first indoor coil in a cooling mode of the climate management system, and to restrict refrigerant flow through a second indoor coil in the cooling mode. The instructions, when executed by the processor, further cause the processor to direct refrigerant flow through the outdoor coil in a second direction and through the second indoor coil in a heating mode of the climate management system, and restrict refrigerant flow through the first indoor coil in the heating mode. The second direction is opposite the first direction.

The present disclosure further relates to a climate management system having a valve disposed along a refrigerant circuit, such that the valve is configured to receive the refrigerant from a compressor disposed along the refrigerant circuit. The climate management system further includes an outdoor coil disposed along the refrigerant circuit, a first indoor coil disposed along the refrigerant circuit, a second indoor coil disposed along the refrigerant circuit and disposed downstream of the first indoor coil relative to a flow of air directed across the first indoor coil and the second indoor coil; and a reversing valve disposed along the refrigerant circuit downstream of the valve. The climate management system is configured to actuate the valve to a first position to direct refrigerant from the compressor to the second indoor coil and to restrict refrigerant from the compressor to the first indoor coil in a first operating mode. The climate management system is further configured to actuate the valve to a second position to direct refrigerant from the compressor to the outdoor coil via the reversing valve and to restrict refrigerant from the compressor to the second indoor coil in a second operating mode.

The present disclosure additionally relates to a controller for a climate management system. The controller includes a memory device and a processor. The memory device includes instructions that, when executed by the processor, cause the processor to: direct refrigerant flow through a hot gas reheat (HGRH) coil of an indoor heat exchanger unit in a heating mode of the climate management system; restrict refrigerant flow through an indoor coil of the indoor heat exchanger unit in the heating mode; and direct refrigerant through an outdoor coil in the heating mode.

DRAWINGS

DETAILED DESCRIPTION

Heating and cooling systems, such as heating, ventilation, and cooling (HVAC) system, may utilize heat exchanger coils as both condensers and evaporators. Particularly, in a heating and cooling system that includes a heat pump system, a first coil, such as an outdoor coil, may be utilized as either a condenser or an evaporator, depending on a mode of operation of the heating and cooling system. Similarly, a second coil, such as in indoor coil, may be utilized as either a condenser or an evaporator, depending on the mode of operation of the heating and cooling system. For example, in cooling mode, the first coil may operate as a condenser, and the second coil may operate as an evaporator. Correspondingly, in a heating mode, the first coil may operate as an evaporator, and the second coil may operate as a condenser. In such instances, because the second coil is designed to function as both an evaporator and a condenser, the second coil may be less efficient as an evaporator compared to coils designed to be exclusively utilized as evaporators.

Accordingly, the present embodiments are directed to a heating and cooling system, such as a heat pump system, having a first indoor coil that may be utilized exclusively as an evaporator, and thus, may be designed to have an increased efficiency as an evaporator. To this end, the heating and cooling system may include a second indoor coil, such as a hot gas reheat (HGRH) coil, which, in the heating mode, may function as the condenser of the heat pump system while refrigerant flow is restricted from passing through the first indoor coil. Correspondingly, while the heating and cooling system is operating in the cooling mode, the first indoor coil may be utilized as an evaporator while refrigerant flow is restricted from passing through the second indoor coil. Further, the heating and cooling system may operate in a dehumidifying mode where the first indoor coil is utilized as an evaporator, and the second indoor coil is utilized as a condenser, while refrigerant flow is restricted from passing through the outdoor coil. In this manner, the first indoor coil may be designed to be exclusively utilized as an evaporator, thereby increasing the efficiency of the heating and cooling system.

Figure 1:
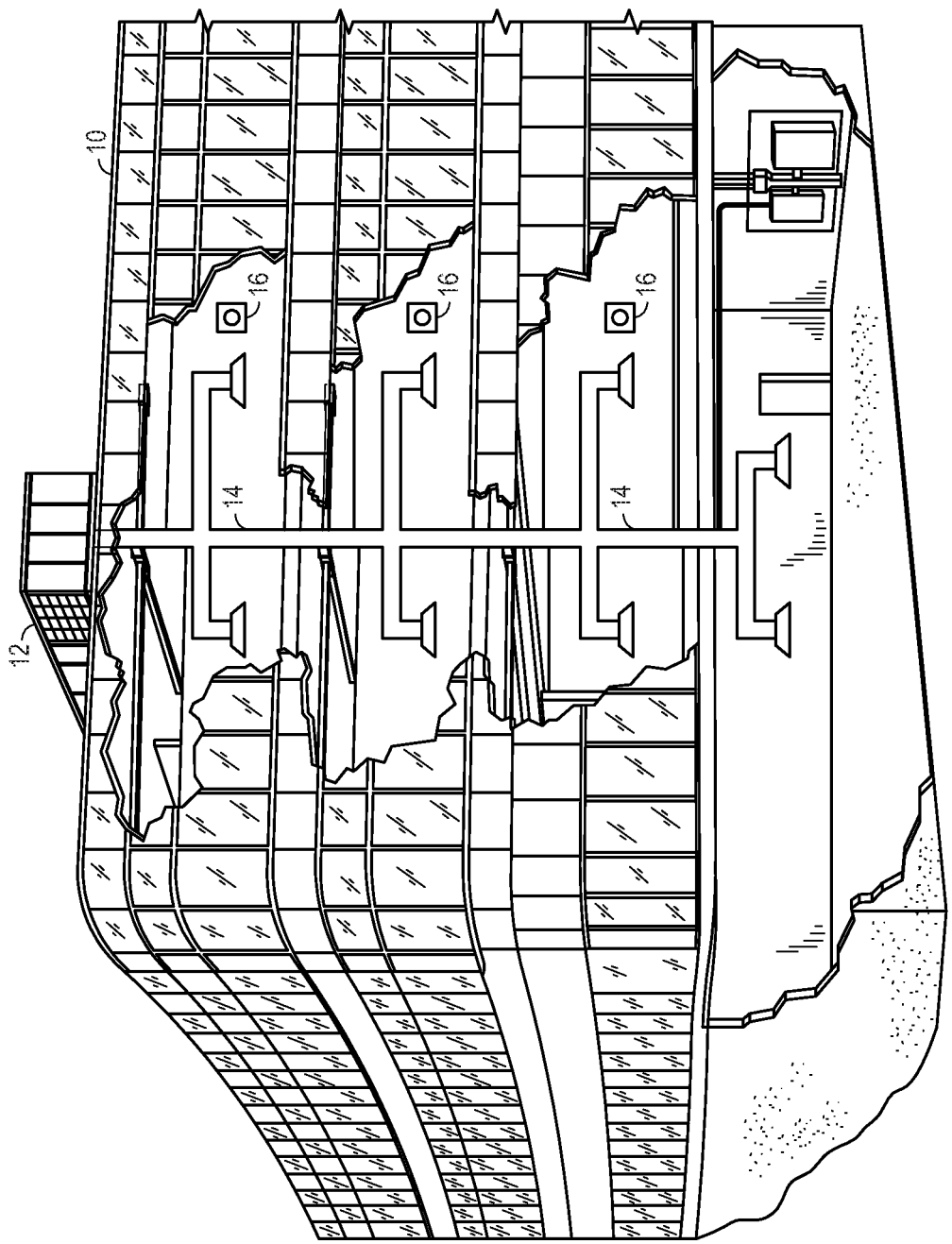
FIG. 1 is a perspective view of an embodiment of a heating, ventilation, and air conditioning (HVAC) system for building environmental management that may employ one or more HVAC units, in accordance with aspects of the present disclosure.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, a humidistat, a dehumidistat, or a combination thereof, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
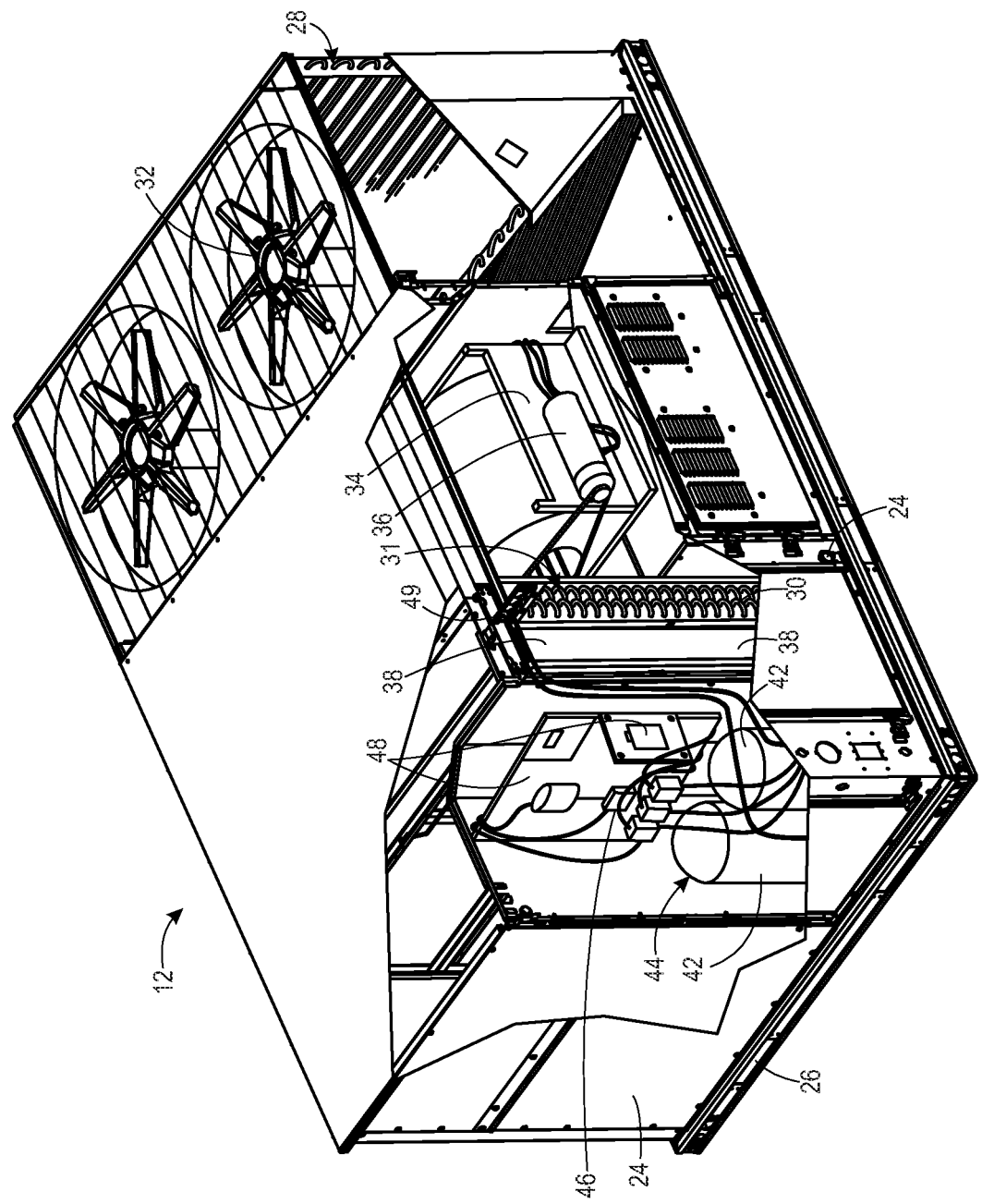
FIG. 2 is a perspective view of an embodiment of an HVAC unit of the HVAC system of FIG. 1, in accordance with aspects of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10. Indeed, in certain embodiments, the HVAC unit 12 may provide dehumidified air to the building.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
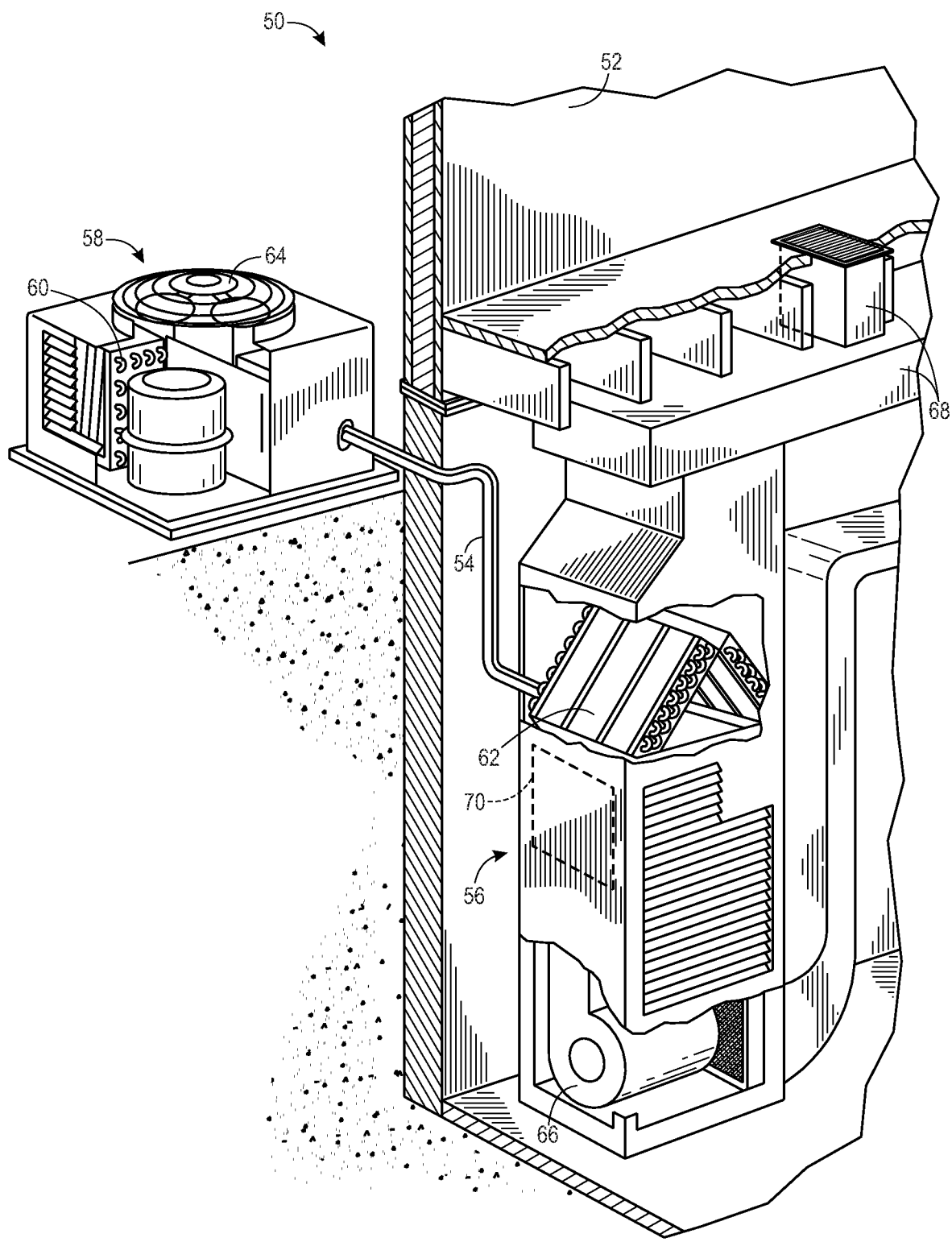
FIG. 3 is a perspective view of an embodiment of a residential split heating and cooling system, in accordance with aspects of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
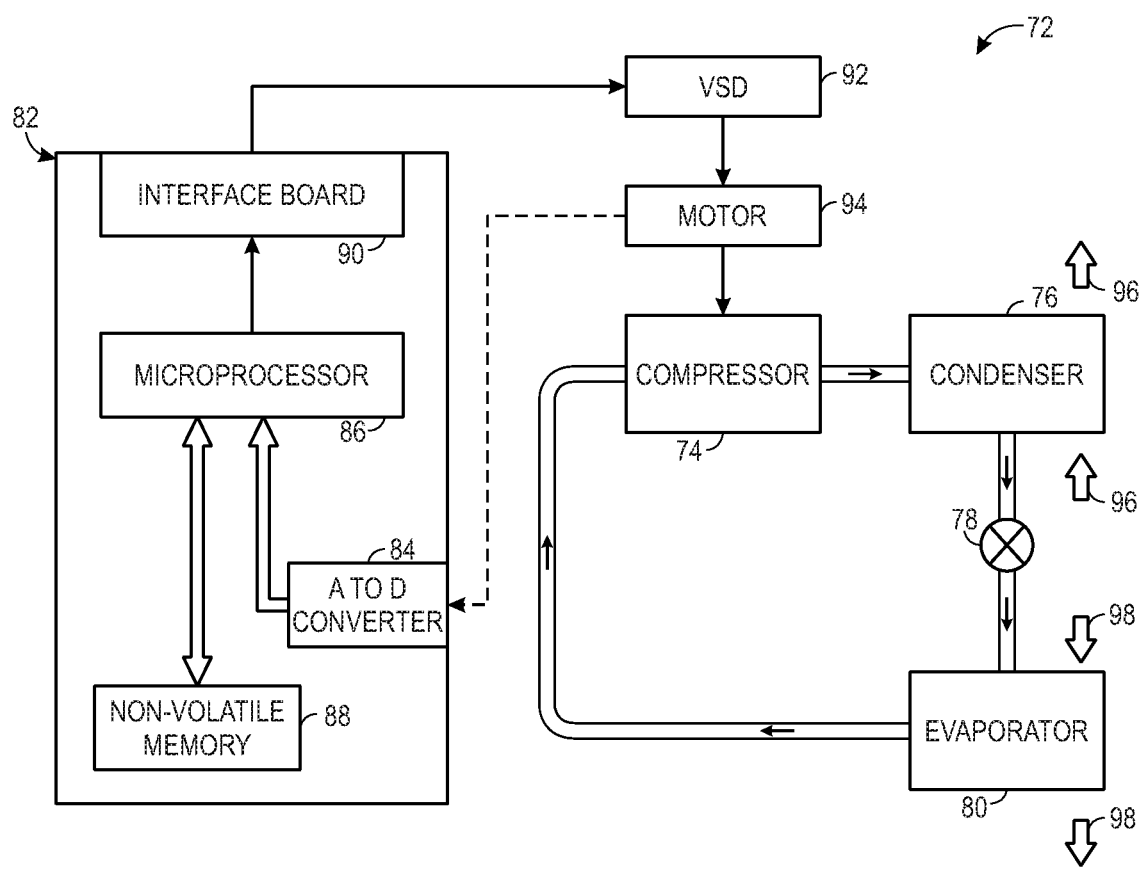
FIG. 4 is a schematic view of an embodiment of a vapor compression system that may be used in an HVAC system, in accordance with aspects of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As set forth above, embodiments of the present disclosure are directed to a system of the HVAC unit 12, the residential heating and cooling system 50, and/or the vapor compression system 72, any of which may referred to as a heating and cooling system 100, such as a climate management system. Additionally, it should be noted that the embodiments discussed herein may be utilized with heating and cooling systems, such as the heating and cooling system 100, having multiple compressors and/or multiple refrigerant circuits. FIGS. 5 through 9 illustrate embodiments of a heat pump system 102 of the heating and cooling system 100, which may utilize a first indoor coil designed for exclusive use as an evaporator, and a second indoor coil, such as a hot gas reheat (HGRH) coil 104.

Figure 5:
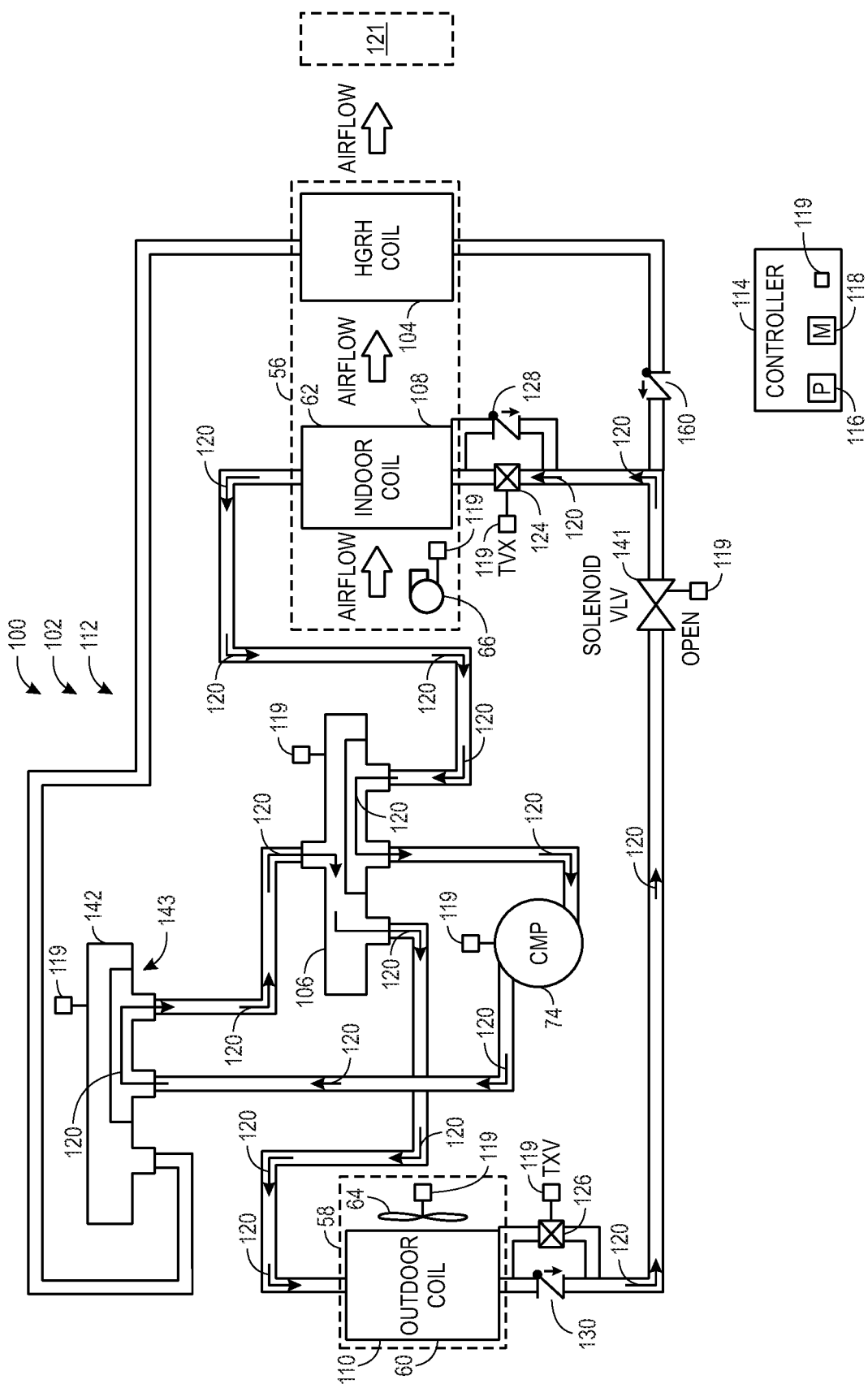
FIG. 5 is a schematic view of an embodiment of a heat pump system having a hot gas reheat coil, in accordance with aspects of the present disclosure.
Figure 6:
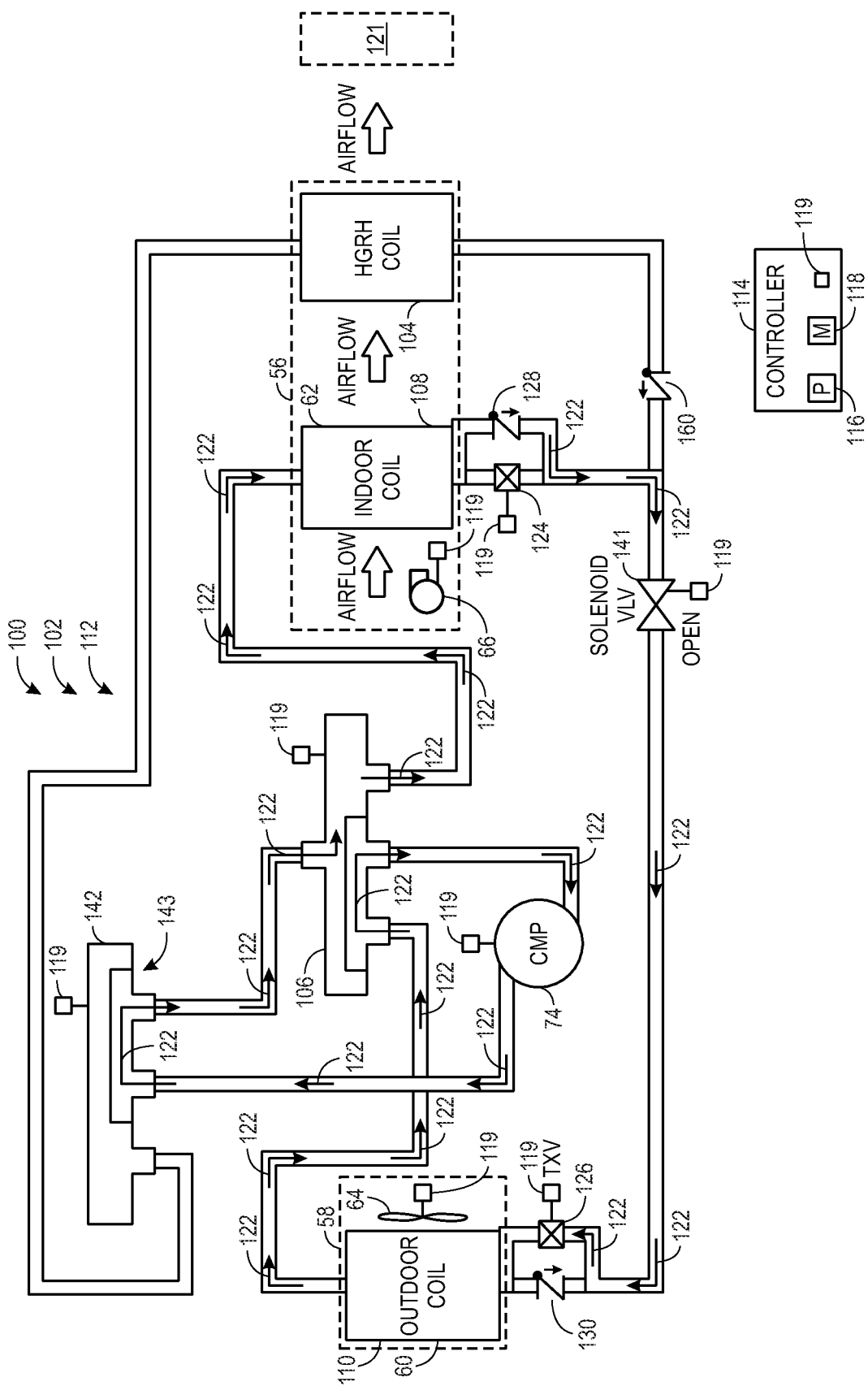
FIG. 6 is a schematic view of an embodiment of the heat pump system of FIG. 5, in accordance with aspects of the present disclosure.

To illustrate, the following discussion focuses on FIGS. 5 and 6, which are schematic representations of the heat pump system 102 of the heating and cooling system 100. In certain embodiments, the heat pump system 102 may include a reversing valve 106, such as a four-way valve. Further, the HVAC system 100 may include the indoor HVAC unit 56 having the heat exchanger 62 discussed above, such as an indoor coil 108, and the outdoor HVAC unit 58 having the heat exchanger 60 discussed above, such as an outdoor coil 110. A compressor, such as the compressor 74 discussed above, along with the reversing valve 106, may be selectively actuated to drive refrigerant through a refrigerant circuit 112 in a first direction 120, as illustrated in FIG. 5. Similarly, the compressor 74 and the reversing valve 106 may be selectively actuated to drive refrigerant through the refrigerant circuit 112 in a second direction 122, opposite of the first direction 120, as illustrated in FIG. 6.

To this end, the heating and cooling system 100 may include a controller 114 configured to perform operations, such as by actuating or otherwise controlling operation of certain elements of the heating and cooling system 100, as described herein. The controller 114 may employ a processor 116, which may represent one or more processors, such as an application-specific processor. The controller 114 may also include a memory device 118 for storing instructions executable by the processor 116 to perform the methods and control actions described herein for the heating and cooling system 100. The processor 116 may include one or more processing devices, and the memory 118 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 116 or by any general purpose or special purpose computer or other machine with a processor. In certain embodiments, the controller 114 may be communicatively coupled to certain elements, such as the compressor 74 and certain valves, of the heating and cooling system 100 via a communication system 119. In some embodiments, the communication system 119 may communicate through a wireless network, such as wireless local area networks (WLAN), wireless wide area networks (WWAN), near field communication (NFC), or Bluetooth. In some embodiments, the communication system 119 may communicate through a wired network, such as local area networks (LAN), or wide area networks (WAN).

As shown in FIG. 5, under operating conditions in which the refrigerant flows through the refrigerant circuit 112 from the outdoor heat exchanger 110 to the indoor heat exchanger 108 in the first direction 120, the controller 114 may activate the fan 64 to force, draw, or otherwise pass air over the outdoor coil 110 to condense the refrigerant flowing through outdoor coil 110. Also, while the refrigerant is flowing in the first direction 120, the controller 114 may activate the blower 66 to force, draw, or otherwise pass air over the indoor coil 108 to evaporate the refrigerant flowing through the indoor coil 108. In this manner, the air passing over the indoor coil 108 is cooled and provided to a conditioned space 121 of the building 10 or residence 52.

Further, as shown in FIG. 6, under operating conditions in which the refrigerant flows through the refrigerant circuit 112 from the indoor heat exchanger 108 to the outdoor heat exchanger 110 in the second direction 122, the controller 114 may activate the fan 64 to force air over the outdoor heat exchanger and enable evaporation of the refrigerant within the outdoor heat exchanger 110. The controller 114 may also activate the blower 66 to force, draw, or pass air over the indoor heat exchanger 108 to condense the refrigerant. Thus, the air passing over the indoor heat exchanger 108 is heated and provided to the conditioned space 121 of the building 10 or residence 52.

Moreover, an expansion valve, such as the expansion device 78, is disposed along the refrigerant circuit 112 between the indoor coil 108 and the outdoor coil 110. Particularly, a first expansion device 124 may be utilized while the refrigerant is flowing through the refrigerant circuit 112 in the first direction 120, and a second expansion device 126 may be utilized while the refrigerant is flowing through the refrigerant circuit 112 in the second direction 122. The first and second expansion devices 124, 126 may also utilize a first one-way valve 128 and a second one-way valve 130, respectively, which operate to block or enable flow therethrough depending on a direction of flow of the refrigerant through the heat pump system 102. For example, when the refrigerant flows through the refrigerant circuit 112 in the first direction 120, the refrigerant may flow through the second one-way valve 130 and through the first expansion device 124. However, when the refrigerant is flowing through the refrigerant circuit 112 in the first direction 120, the first one-way valve 128 blocks refrigerant flow therethrough. When the refrigerant flows in the second direction 122, the refrigerant may flow through the first one-way valve 128 and through the second expansion device 126, while the second one-way valve 130 blocks refrigerant flow therethrough.

Additionally, the heat pump system 102 may include a solenoid valve 141 disposed along the refrigerant loop 112 between the indoor coil 108 and the outdoor coil 110. As shown, the solenoid valve 141 may be set to open to enable refrigerant to flow in the first direction 120 (FIG. 5) or the second direction 122 (FIG. 6).

Moreover, as illustrated in FIGS. 5 through 9, the heating and cooling system 100 may include a three-way valve 142 disposed downstream, such as directly downstream, of the outlet of the compressor 74 in the refrigerant circuit 112. As used herein, description of a first element disposed "directly" downstream/upstream relative to a second element may indicate that there is not a third element, such as a valve, a pump, a coil, or a flow restricting element disposed between the first and second element. In other words, while a conduit may be disposed between the first element and the second element to fluidly couple the first element and the second element, a third element that modifies flow of the refrigerant may not be disposed on the conduit between the first element and the second element. Moreover, as used herein, the downstream and upstream directions may be relative to the direction of flow of refrigerant through the refrigerant circuit 112, which may vary depending on a mode of operation of the heating and cooling system 100.

The three-way valve 142 is also fluidly coupled to the reversing valve 106 and the HGRH coil 104. When the heating and cooling system 100 is operating to provide cooled or heated air to the conditioned space 121, as described above in reference to FIGS. 5 and 6, respectively, the three-way valve 142 may be set to a first position 143 to direct refrigerant from the compressor 74 to the reversing valve 106, and restrict or block refrigerant flow to the HGRH coil 104. As discussed below, in certain embodiments and/or during other operating modes of the heating and cooling system 100, the three-way valve 142 may be actuated to a second position 145 to direct at least a portion of refrigerant from the compressor 74 to the HGRH coil 104, which may be utilized as a condenser to provide heated air to the conditioned space 121.

Figure 7:
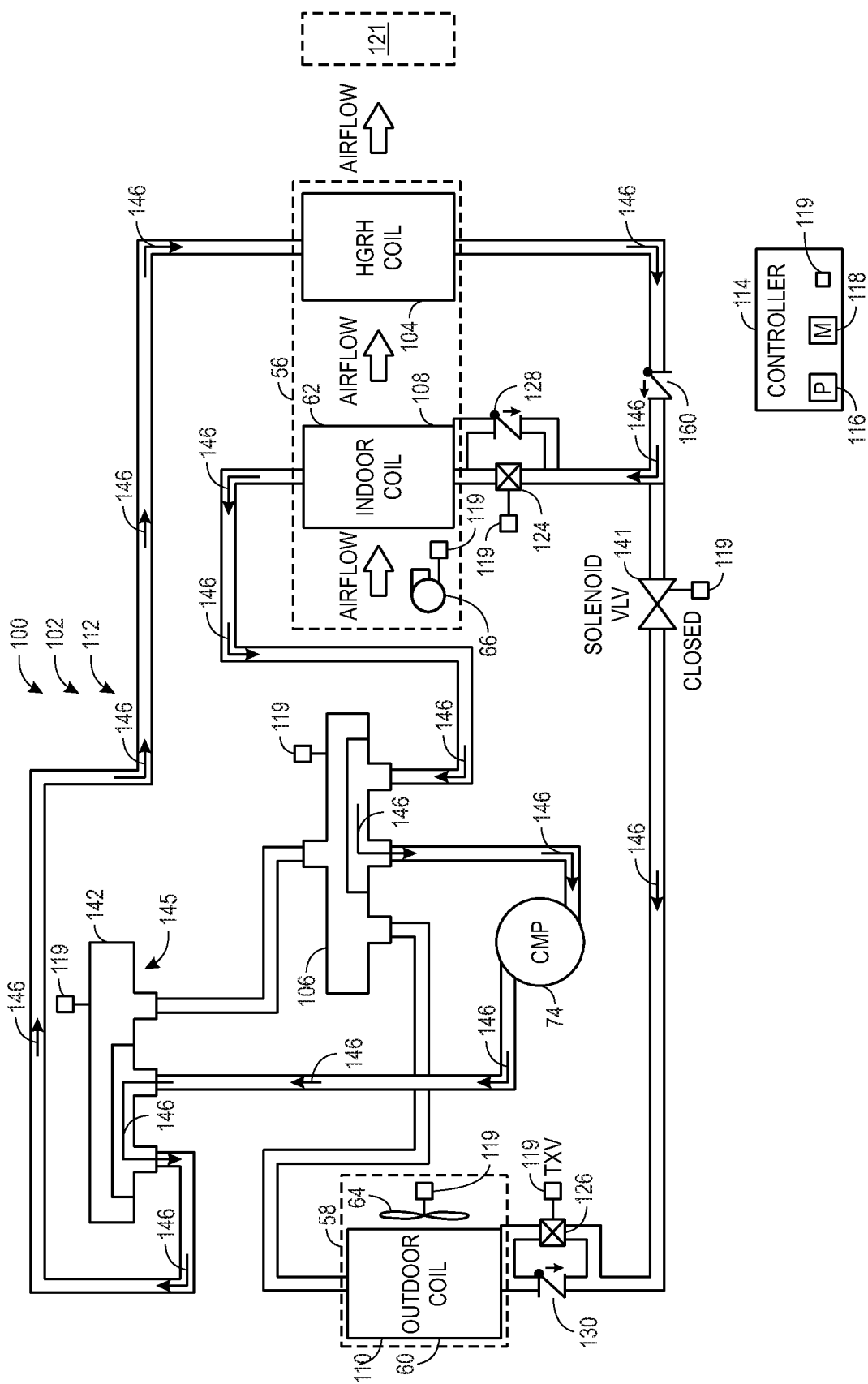
FIG. 7 is a schematic view of an embodiment of the heat pump system of FIG. 5, in accordance with aspects of the present disclosure.

For example, as shown in FIG. 7, the reversing valve 106 and the three-way valve 142 may be actuated to direct refrigerant in a third direction 146 through the refrigerant circuit 112 to dehumidify and/or cool air that is provided to the conditioned space 121. Particularly, the refrigerant may first flow from the compressor 74 to the three-way valve 142, which may be in the second position 145, then to the HGRH coil 104, then to the indoor coil 108, then to the reversing valve 106, and then back to the compressor 74, as indicated by the third direction 146. Further, the solenoid valve 141 may be set to a closed position, thereby directing refrigerant from the HGRH coil 104 to the first expansion device 124 and to the indoor coil 108. In this manner, the indoor coil 108 may act as an evaporator. Particularly, the heating and cooling system 100 may activate the blower 66 to force, draw, or pass air over the indoor coil 108, thereby placing the air in a heat exchange relationship with refrigerant passing through the indoor coil 108, and thus evaporating the refrigerant as it passes through the indoor coil 108. Correspondingly, while the refrigerant is flowing in the third direction 146, the HGRH coil 104 may act as a condenser. As the air passes over the indoor coil 108, moisture in the air may be condensed as the air is cooled. The cooled air may then pass over the HGRH coil 104, which may heat the air to a suitable temperature. While the air may be heated by the HGRH coil 104 before being provided to the conditioned space 121, the air ultimately provided to the conditioned space 121 after exchanging heat with the indoor coil 108 and the HGRH coil 104 may have a temperature substantially equal, or less than, the actual temperature of the conditioned space 121.

Indeed, as shown schematically, both the indoor coil 108 and the HGRH coil 104 may be disposed within the indoor heat exchanger 56. Therefore, due at least in part to the proximity of the indoor coil 108 to the HGRH coil 104, the blower 66 may force or draw the air over both the indoor coil 108 and the HGRH coil 104. In certain embodiments, the flow of refrigerant in the third direction 146 may be utilized by the heating and cooling system 100 when an external environment surrounding the building 10 or residence 52 is cool and humid. For example, in such embodiments, the indoor coil 108 may dehumidify the air by cooling the air, thereby condensing and removing moisture within the air, and the HGRH coil 104 may heat the air to a suitable temperature after being dehumidified by the indoor coil 108. In some embodiments, while the refrigerant flows through the refrigerant circuit 112 in the third direction 146 as described above, the HGRH coil 104 may function as a condenser of the heating and cooling system 100. Indeed, the refrigerant flowing from the three-way valve 142 may be condensed as it passes through the HGRH coil 104.

Figure 8:
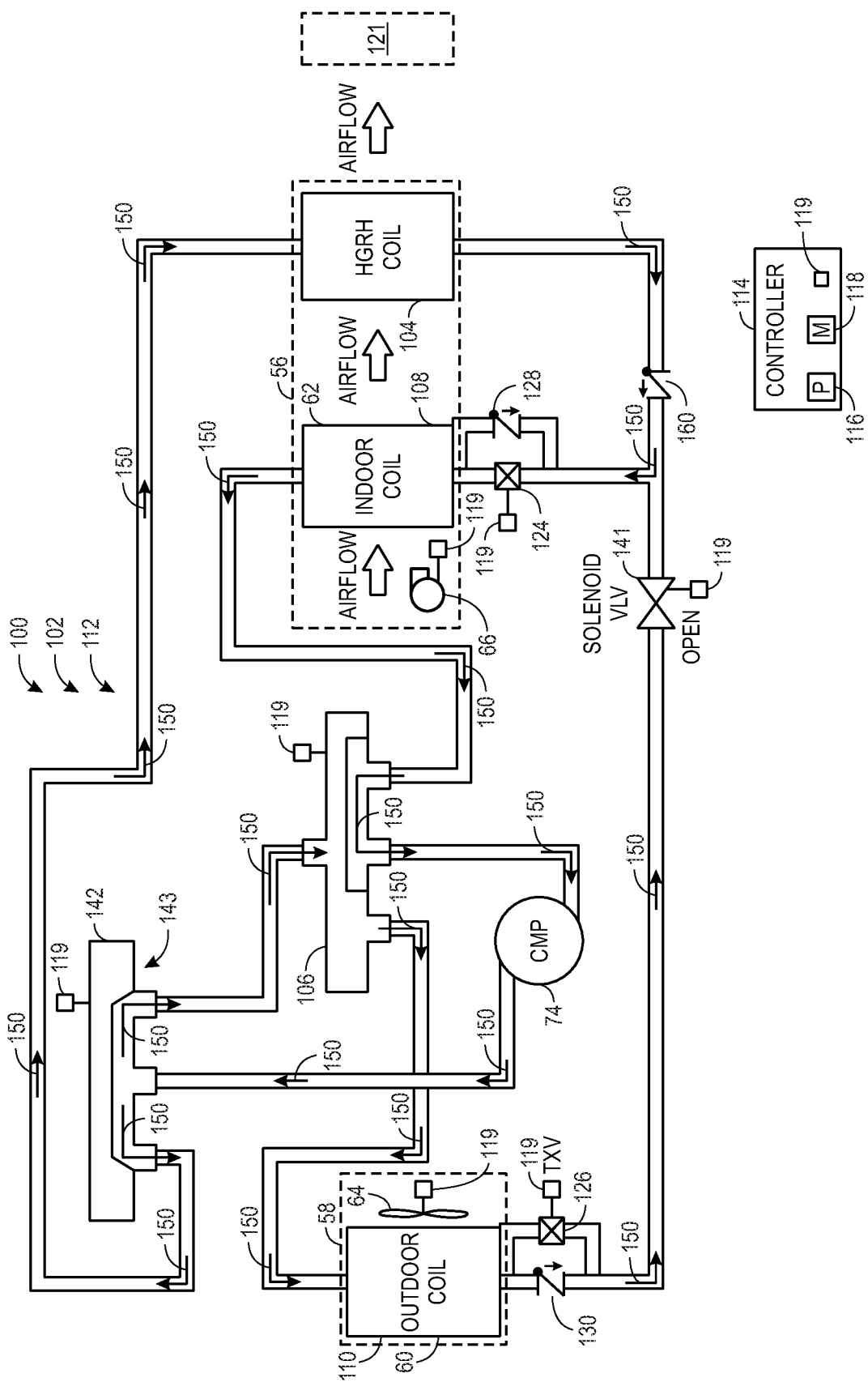
FIG. 8 is a schematic view of an embodiment of the heat pump system of FIG. 5, in accordance with aspects of the present disclosure.

In certain embodiments, the three-way valve 142 may act as a modulating valve. Particularly, as shown in FIG. 8, the refrigerant may flow in a fourth direction 150 through the refrigerant circuit 112. The fourth direction 150 of refrigerant flow may be similar to the third direction 146, except the three-way valve 142 may be actuated to direct a portion of refrigerant through the reversing valve 106 to the outdoor coil 110 in addition to directing another portion of refrigerant to the HGRH coil 104. In this manner, the three-way valve 142 may control an amount of refrigerant that is directed to the HGRH coil 104, thereby controlling the heat exchange process between the air and the HGRH coil 104. Correspondingly, the three-way valve 142 may control an amount of refrigerant that is directed to the outdoor coil 110, thereby controlling the heat exchange process between the air and the outdoor coil. Indeed, the amount of refrigerant directed through the HGRH coil 104 and through the outdoor coil 110 may be inversely related. For example, the three-way valve 142 may direct less refrigerant through the HGRH coil 104 or the outdoor coil 110 to decrease an amount of heat transferred to the air as it passes over the HGRH coil 104 or the outdoor coil, respectively. Correspondingly, the three-way valve 142 may direct more refrigerant through the HGRH coil 104 or through the outdoor coil 110 to increase an amount of heat transferred to the air as it passes over the HGRH coil 104 or the outdoor coil 110, respectively. Indeed, in the embodiments illustrated in FIG. 8, such as when the refrigerant flows through the refrigerant circuit 112 in the fourth direction 150, the solenoid valve 141 may be set to an open position.

Figure 9:
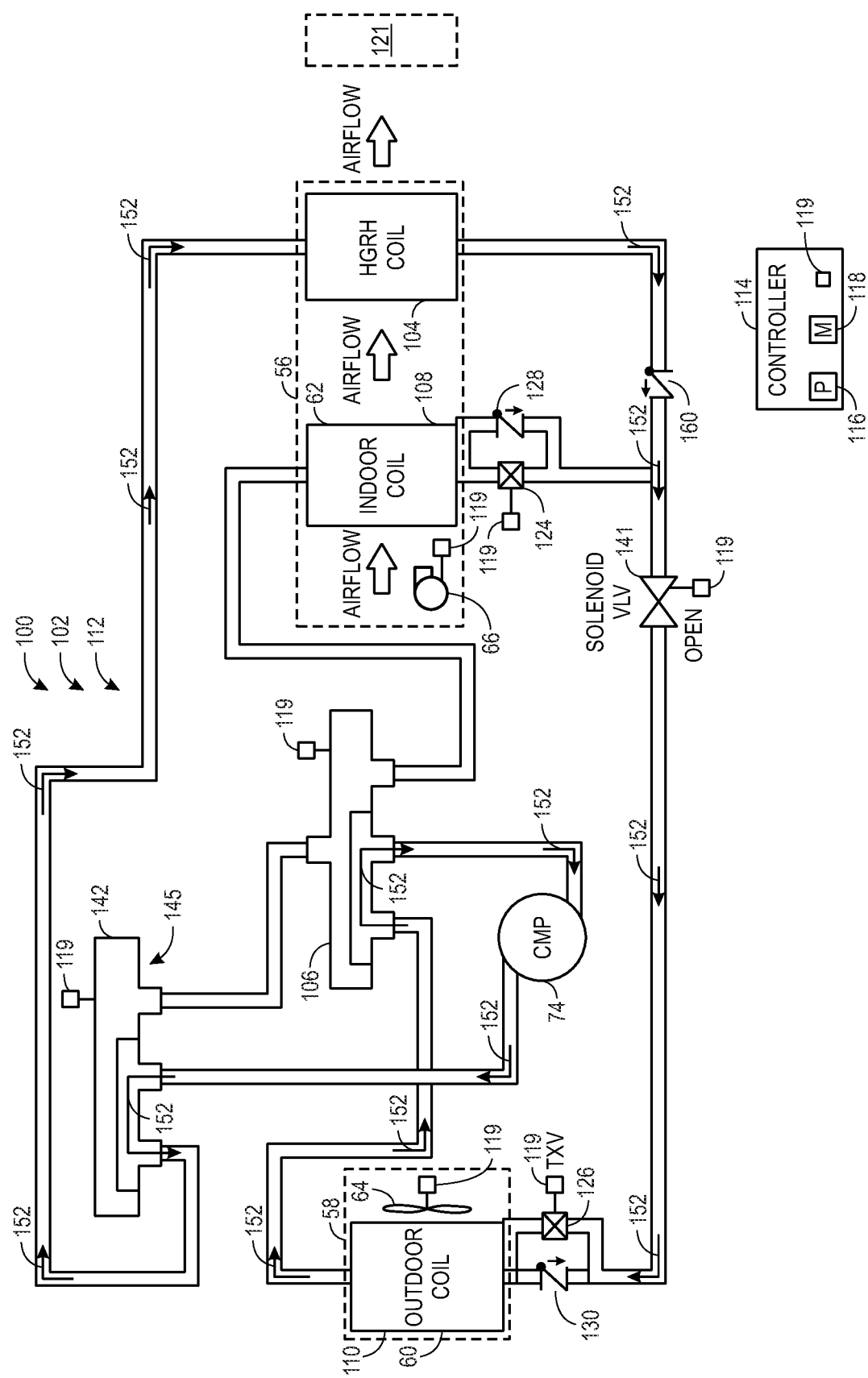
FIG. 9 is a schematic view of an embodiment of the heat pump system of FIG. 5, in accordance with aspects of the present disclosure.

Furthermore, in some embodiments, the refrigerant may flow in a fifth direction 152 through the refrigerant circuit 112, as illustrated in FIG. 9. Particularly, the compressor 74 may pump refrigerant to the three-way valve 142, which may be actuated in the second position 145, to direct the refrigerant through the HGRH coil 104, through the solenoid valve 141, through the second expansion device 126, and through the outdoor coil 110 to the reversing valve 106, which may be set to direct the refrigerant back to the compressor 74. In this manner, the HGRH coil 104 may act as a condenser to provide heated air to a conditioned space. For example, while the refrigerant flows through the refrigerant circuit 112 in the fifth direction 152, the blower 66 may be activated to force or draw air over the HGRH coil 104. Thus, the air is put in a heat exchange relationship with the refrigerant that is passing through the HGRH coil 104. As the air passes over the HGRH coil 104, the air may absorb heat from the refrigerant, which may condense the refrigerant in the HGRH coil 104.

In the configuration and operating condition illustrated in FIG. 9, the HGRH coil 104, instead of the indoor coil 108, is utilized as the condenser of the heating and cooling system 100. In other words, the HGRH reheat coil 104 may be utilized to substantially completely condense the refrigerant before the refrigerant is provided to the outdoor coil 100, which functions as the evaporator. Thus, in such a configuration and operating mode, the HGRH coil 104 may be the only coil in the indoor unit 56 that is utilized to condense refrigerant while the refrigerant flows in the third direction 146 and fifth direction 152, as shown in FIGS. 7 and 9, respectively. While the refrigerant flows through the refrigerant circuit 112 in the fifth direction 152, the fan 64 may be activated to force or draw air over the outdoor coil 110. Indeed, in such embodiments, the outdoor coil 110 may function as an evaporator, such that refrigerant passing through the outdoor coil 110 is evaporated as the refrigerant absorbs heat from the air passing over the outdoor coil 110.

Further, while the refrigerant flows through the refrigerant circuit 112 in the fifth direction 152, refrigerant flow to the indoor coil 108 may be restricted. For example, in certain embodiments, the three-way valve 142 may restrict refrigerant to the indoor coil 108 when the indoor coil 108 is actuated to the second position 145, thereby restricting flow from the compressor 74 to the indoor coil 108. Instead, in the second position 145, refrigerant flow is directed from the compressor 74 to the HGRH coil 104. Further, in certain embodiments, the first expansion device 124 may be positioned to restrict flow to the indoor coil 108 when the refrigerant flows through the refrigerant circuit 112 in the fifth direction 152.

In certain embodiments, the indoor coil 108 may be configured to be particularly efficient as an evaporator. For example, the design or configuration of the indoor coil 108, including tube size, fin density, overall dimensions, or any other suitable design factor of the indoor coil 108, may be selected with the intention that the indoor coil 108 function primarily or exclusively as an evaporator. In other words, the design or configuration of the indoor coil 108 may be selected to optimize, enhance, or improve transfer of heat from a flow of air forced or drawn across the indoor coil 108 by the blower 66 to refrigerant flowing through the indoor coil 108. For example, the indoor coil 108 may exclusively function as an evaporator when the heating and cooling system 100 is operating to provide heating, cooling, and/or dehumidification, as shown in FIGS. 5, 7, 8, and 9. Particularly, as shown in FIG. 5, the indoor coil 108 may function as an evaporator to provide cooled air to the conditioned space 121. As shown in FIGS. 7 and 8, the indoor coil 108 may act as an evaporator to dehumidify/cool air before the air is provided to the conditioned space 121. As shown in FIG. 9, refrigerant flow may be restricted from the indoor coil 108, while the air is heated by the HGRH coil 104 before being provided to the conditioned space. That is, in the configuration shown in FIG. 9, the indoor coil 108 is not used as refrigerant flow therethrough is restricted, while the HGRH coil 104 functions as a condenser, and the outdoor coil 110 functions as an evaporator to provide heating to the conditioned space 121. Further, in embodiments where refrigerant flow is restricted through a portion of the heating and cooling system 100, the heating and cooling system 100 may utilize one or more drain valves configured to drain refrigerant from the portion of the heating and cooling system 100 through which refrigerant flow is restricted. For example, as discussed above, refrigerant flow may be restricted through the indoor coil 108 while the refrigerant flows through the refrigerant circuit 112 in the fifth direction 152. In such embodiments, the drain valve may be placed in the refrigerant circuit 112 between the HGRH coil 104 and the inlet of the compressor 74 such that refrigerant may be drained from the portion of the heating and cooling system 100 that includes the indoor coil 108.

Moreover, in certain embodiments, the first one way valve 128 may not be present in the heating and cooling system 100. Indeed, while a traditional heat pump system may utilize a one way valve when a single indoor coil of an indoor unit functions as a condenser in certain operating modes and an evaporator in other operating modes, the embodiments disclosed herein may utilize the indoor coil 108 exclusively as an evaporator, as the disclosed embodiments operate to utilize the HGRH coil 104 as an indoor condenser. Particularly, as shown in FIGS. 5, 7, 8, and 9, the refrigerant flow may flow through the indoor coil 108 in a direction from the first expansion device 124 to the indoor coil 108 or may not flow through the indoor coil 108 at all when providing heating, cooling, and/or dehumidification. Accordingly, due at least in part to the singular flow direction through the indoor coil 108, the first one way valve 124 may not be utilized. Indeed, the first expansion device 124 may be closed to block refrigerant flow to the indoor coil 108 in the singular flow direction when the heating and cooling system 100 is operated in the configuration shown in FIG. 9.

With the foregoing in mind, the indoor coil 108 may be particularly designed to be utilized exclusively as an evaporator. That is, the indoor coil 108 may be designed such that air passing over the indoor coil 108 transfers heat to refrigerant flowing through the indoor coil 108 with increased efficiency. Particularly, the indoor coil 108 may be designed such that certain parameters may increase the heat transfer from the air to the refrigerant. For example, parameters, such as geometries of tubes and fins of the indoor coil 108, densities of the tubes and fins, a number of turns of the indoor coil 108, a number of tubes, and the like, may some or all be selected or designed such that heat transfer from the air to the refrigerant may be increased, improved, enhanced, or optimized. Indeed, because the indoor coil 108 may not be utilized as a condenser, the above mentioned parameters may be designed without regard to increasing an efficiency of heat transfer from the refrigerant within the indoor coil 108 to the air.

Similarly, the HGRH coil 104 may be particularly designed to be utilized exclusively as a condenser. That is, the HGRH coil 104 may be designed such that refrigerant flowing through the HGRH coil 104 transfers heat to air passing over the coil with increased efficiency. Particularly, the HGRH coil 104 may be designed such that certain parameters may increase the heat transfer from the refrigerant to the air. For example, parameters, such as geometries of tubes and fins of the HGRH coil 104, densities of the tubes and fins, a number of turns of the HGRH coil 104, a number of tubes, and the like, may some or all be selected or designed such that heat transfer from the refrigerant to the air may be increased, improved, enhanced, or optimized. Indeed, because the HGRH coil 104 may not be utilized as an evaporator, the above mentioned parameters may be designed without regard to increasing an efficiency of heat transfer from the air to the refrigerant. To this end, as shown, the refrigerant circuit 112 may include a third one-way valve 160, such that refrigerant may be restricted from flowing in a direction from the third one-way valve 160 to the HGRH coil 104.

Accordingly, the present disclosure is directed to providing systems and methods for a heating and cooling system with increased efficiency. Particularly, a heat pump system may utilize an outdoor coil, a first indoor coil, and a second indoor coil, such as a hot gas reheat (HGRH) coil, to provide heating, cooling, and/or dehumidification to a conditioned space. In a cooling mode, refrigerant flow may be directed to the outdoor coil and the first indoor coil, and refrigerant flow may be restricted from flowing to the second indoor coil, such that the outdoor coil may be utilized as a condenser and the first indoor coil may be utilized as an evaporator. In a heating mode, refrigerant flow may be directed to the outdoor coil and the second indoor coil, and refrigerant flow may be restricted from flowing to the first indoor coil, such that the outdoor coil may be utilized as an evaporator and the second indoor coil may be utilized as a condenser. Indeed, whether the heating and cooling system is providing heating, cooling, and/or dehumidification, the first indoor coil may only be utilized as an evaporator coil. Thus, the first indoor coil may be specifically designed to be used exclusively as an evaporator. That is, parameters of the indoor coil may be designed to increase, enhance, improve, or optimize heat transfer from refrigerant flowing through the first indoor coil to air flowing over the first indoor coil, thereby generally increasing the efficiency of the heating and cooling system.

While only certain features and embodiments of the present disclosure have been illustrated and described, many modifications and changes may occur to those skilled in the art, such as variations in sizes, dimensions, structures, shapes and proportions of the various elements, values of parameters, such as temperatures or pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A climate management system, comprising:
an outdoor coil of a refrigerant circuit;
a first indoor coil of the refrigerant circuit; and
a second indoor coil of the refrigerant circuit disposed downstream of the first indoor coil with respect to a flow of air directed across the first indoor coil and the second indoor coil,
wherein the climate management system is configured to, in a cooling mode, direct refrigerant flow in a first direction through the outdoor coil, direct refrigerant flow through the first indoor coil, and block refrigerant flow from the second indoor coil, and
wherein the climate management system is configured to, in a heating mode, direct refrigerant flow in a second direction through the outdoor coil, direct refrigerant flow through the second indoor coil, and block refrigerant flow from the first indoor coil throughout the heating mode, wherein the second direction is opposite the first direction.

2. The climate management system of claim 1, wherein, in the cooling mode, the outdoor coil is configured to function as a condenser and the first indoor coil is configured to function as an evaporator, and wherein, in the heating mode, the outdoor coil is configured to function as the evaporator and the second indoor coil is configured to function as the condenser.

3. The climate management system of claim 1, wherein the second indoor coil comprises a hot gas reheat (HGRH) coil.

4. The climate management system of claim 1, comprising:
a compressor of the refrigerant circuit configured to circulate the refrigerant flow through the outdoor coil, the first indoor coil, and the second indoor coil; and
a valve disposed along the refrigerant circuit downstream of the compressor, wherein the climate management system is configured to, in the cooling mode, control the valve to direct refrigerant flow from the compressor to the outdoor coil and block refrigerant flow from the compressor to the second indoor coil, and in the heating mode, control the valve to direct refrigerant flow from the compressor to the second indoor coil and block refrigerant flow from the compressor to the first indoor coil.

5. The climate management system of claim 4, wherein the valve is disposed directly downstream of the compressor.

6. The climate management system of claim 4, wherein the valve is a three-way valve.

7. The climate management system of claim 1, wherein the climate management system is configured to, in a dehumidifying mode, direct refrigerant flow to the first indoor coil and the second indoor coil and to block refrigerant flow from the outdoor coil.

8. The climate management system of claim 1, comprising a heat pump having the outdoor coil, the first indoor coil, and the second indoor coil.

9. The climate management system of claim 1, comprising:
a compressor of the refrigerant circuit configured to circulate refrigerant flow through the outdoor coil, the first indoor coil, and the second indoor coil;
a three-way valve disposed along the refrigerant circuit downstream of the compressor; and
a reversing valve disposed along the refrigerant circuit upstream of the compressor, wherein the climate management system is configured to, in the cooling mode, control the three-way valve to direct refrigerant flow from the compressor to the reversing valve and control the reversing valve to direct refrigerant flow from the three-way valve to the outdoor coil.

10. The climate management system of claim 1, comprising an indoor heat exchange unit, and wherein the first indoor coil and the second indoor coil are packaged together within the indoor heat exchange unit.

11. A climate management system, comprising:
a control system configured to control climate characteristics in a building, wherein the control system comprises a memory device and a processor, and wherein the memory device includes instructions that, when executed by the processor, cause the processor to:
direct refrigerant flow through an outdoor coil in a first direction and through a first indoor coil in a cooling mode of the climate management system;
block refrigerant flow through a second indoor coil in the cooling mode;
direct refrigerant flow through the outdoor coil in a second direction and through the second indoor coil in a heating mode of the climate management system, wherein the second direction is opposite the first direction; and
block refrigerant flow through the first indoor coil throughout the heating mode.

12. The climate management system of claim 11, wherein the instructions, when executed by the processor, cause the processor to:
direct refrigerant flow through the first indoor coil and through the second indoor coil in a dehumidifying mode of the climate management system; and
block refrigerant flow through the outdoor coil in the dehumidifying mode.

13. The climate management system of claim 11, wherein the instructions, when executed by the processor, cause the processor to direct refrigerant flow through the outdoor coil in the cooling mode via actuation of a three-way valve disposed downstream of a compressor of the climate management system.

14. The climate management system of claim 13, wherein the instructions, when executed by the processor, cause the processor to direct the refrigerant flow through the second indoor coil in the heating mode via actuation of the three-way valve.

15. A climate management system, comprising:
a valve disposed along a refrigerant circuit, wherein the valve is configured to receive refrigerant from a compressor disposed along the refrigerant circuit;
an outdoor coil disposed along the refrigerant circuit;
a first indoor coil disposed along the refrigerant circuit;
a second indoor coil disposed along the refrigerant circuit and disposed downstream of the first indoor coil relative to a flow of air directed across the first indoor coil and the second indoor coil; and
a reversing valve disposed along the refrigerant circuit downstream of the valve,
wherein the climate management system is configured to actuate the valve to a first position to direct refrigerant from the compressor to the second indoor coil and to block refrigerant from the compressor to the first indoor coil throughout a first operating mode, and
wherein the climate management system is configured to actuate the valve to a second position to direct refrigerant from the compressor to the outdoor coil via the reversing valve and to block refrigerant from the compressor to the second indoor coil in a second operating mode.

16. The climate management system of claim 15, wherein the climate management system is configured to provide heated air to a conditioned space in the first operating mode, and to provide cooled air to the conditioned space in the second operating mode.

17. The climate management system of claim 15, wherein the climate management system is configured to direct refrigerant from the second indoor coil to the outdoor coil in the first operating mode.

18. The climate management system of claim 15, wherein the climate management system is configured to direct refrigerant from the outdoor coil to the first indoor coil in the second operating mode.

19. The climate management system of claim 15, wherein the first indoor coil is designed and configured for operation as only an evaporator.

20. The climate management system of claim 15, wherein the second indoor coil is designed and configured for operation as only a condenser.

21. The climate management system of claim 15, wherein the valve comprises a modulating three-way valve.

22. The climate management system of claim 15, wherein the valve is a first valve, and wherein the climate management system is configured to actuate the first valve to the first position to direct refrigerant from the compressor to the second indoor coil and to actuate a second valve disposed along the refrigerant circuit to direct refrigerant from second indoor coil to the first indoor coil in a third operating mode.

23. A controller for a climate management system, comprising:
 a memory device and a processor, and wherein the memory device includes instructions that, when executed by the processor, cause the processor to:
  direct refrigerant flow through a hot gas reheat (HGRH) coil of an indoor heat exchanger unit in a heating mode of the climate management system;
  block refrigerant flow through an indoor coil of the indoor heat exchanger unit throughout the heating mode; and
  direct refrigerant through an outdoor coil in the heating mode.

24. The controller of claim 23, wherein the instructions, when executed by the processor, cause the processor to:
  direct refrigerant from a compressor to the HGRH coil;
  direct refrigerant from the HGRH coil to the outdoor coil; and
  direct refrigerant from the outdoor coil to the compressor.

25. The controller of claim 23, wherein the instructions, when executed by the processor, cause the processor to:
  activate a first air mover to move air over the indoor coil and the HGRH coil to condense refrigerant in the HGRH; and
  activate a second air mover to move air over the outdoor coil to evaporate refrigerant in the outdoor coil.

* * * * *